Patented Sept. 29, 1953

2,653,931

UNITED STATES PATENT OFFICE 2,653,931

PROCESS FOR LABELING POLYSACCHA-RIDES WITH $C^{14}$ AND PRODUCTS RESULTING THEREFROM

Horace S. Isbell, Washington, D. C., assignor to the United States of America as represented by the Secretary of Commerce No Drawing. Application April 25, 1951, Serial No. 222,924

4 Claims. (Cl. 260—209)

(Granted under Title 35, U. S. Code (1952), sec. 266)

The invention described herein may be manufactured and used by or for the Government of the United States for governmental purposes without the payment to me of any royalty thereon in accordance with the provisions of the Act of March 3, 1883, as amended (45 Stat. 467; 35 U. S. C. 45).

The present invention relates to a process for introducing $C^{14}$ into polysaccharides. It is an object of the invention to provide a simple method for the preparation of radioactive polysaccharides suitable for use as tracers. Possible applications of the new products for biological and structural studies are manifold. One of the specific applications is for the preparation of labeled dextran blood plasma substitutes. These materials offer a means for following the fate of the material in the animal body and for attacking problems which cannot be solved by conventional means. Heretofore labeled polysaccharides have been made by biological methods and plant synthesis, using $C^{14}$-labeled $CO_2$, sugars and other materials. All of the methods are laborious and not suitable for the production of relatively large quantities of material.

In accordance with the present invention, labeled polysaccharides are obtained by condensation of the polysaccharide with $C^{14}$-labeled cyanide preferably in the presence of a carbonate-bicarbonate buffer. After the condensation reaction is complete the resulting nitrile is saponified and the ammonia formed is removed by heating the reaction mixture under reduced pressure. The residue is acidified and any unreacted cyanide is recovered by distillation into sodium hydroxide solution. The resulting labeled polysaccharide differs from the parent polysaccharide in that the reducing end group is replaced by an end group, consisting of the next higher aldonic acid labeled on the carboxyl group with $C^{14}$. The polysaccharide can be separated in known manner, say by precipitation with alcohol. In some cases the product can be purified further and fractionated by adsorption on an ion exchange resin and elution with a base.

In the practice of the invention, satisfactory results have been obtained with such polysaccharides as dextran, dextran hydrolyzates, starch, dextrins, pectin, algin, synthetic polyoses, starch conversion liquors, cellulose, guar gum, and inulin, but the process is not limited to these. Satisfactory condensations have been obtained with sodium cyanide and sodium carbonate-sodium bicarbonate buffers, with HCN plus ammonia and with alkali and alkaline earth cyanides. If the process is used in connection with a polysaccharide such as the dextran substitutes, the several steps are as follows:

To 400 ml. of a 6-percent aqueous solution of partially hydrolyzed dextran are added 0.1 g. of sodium bicarbonate and 2 ml. of a sodium cyanide-sodium carbonate solution containing 1 millimole of $C^{14}$-labeled sodium cyanide and 1.1 millimoles of sodium hydroxide. The mixture is allowed to stand at room temperature for one week or more. It is then heated at 60° C. for several hours under reduced pressure to saponify the nitriles and to remove the ammonia formed. The solution is acidified with acetic acid and then lyophilized to remove any unreacted sodium cyanide. The resulting product has a $C^{14}$-labeled carboxyl group attached to the carbon originally present in the reducing group. The radioactivity of the product depends on the specific activity of the cyanide used and varies with the average molecular weight of the dextran. Reaction of the polysaccharide with the cyanide is relatively slow but can be readily followed by determination of the radioactivity of the product obtained with various reaction periods. Ordinarily, activity becomes substantially constant in about one week. With sodium cyanide having an activity of 2 millicuries per millimole, and a commercial dextran plasma substitute, the product has an activity of about 30 microcuries per gram.

Concentration and fractionation of the product by use of ion exchange resins is shown by the following experiment:

A 1.09 g. sample of $C^{14}$-labeled dextran (1.73 $\mu c/g$.) dissolved in 10 ml. of water is passed successively through a column (0.6×8 cm.) of Amberlite IR100 resin, and a column (0.6×8 cm.) of Duolite A4 resin. The columns are successively washed with 200 ml. of water.

The material which passes through the column weighs, after drying, about 0.95 g. and has a specific activity of 1.26 microcuries per gram. Elution of the Duolite resin with aqueous ammonia and drying of the product gives 0.1 g. of product having an activity of 6.4 microcuries per gram.

Treatment of the polysaccharides listed below with radioactive cyanide gave radioactive polysaccharides containing $C^{14}$-carbonyl groups corresponding to the HC*N combining power as listed:

| Material | HC*N Combining Power, Millimoles CN/g. | Apparent molecular weight |
|---|---|---|
| Dextran (Commercial Solvents plasma substitute) | 0.0267 | 37,400 |
| Dextran (Swedish, Macrodex substance) | .0346 | 28,900 |
| Common powdered corn starch (Am. Maize Products Co.) | .0175 | 57,100 |
| Inulin | .0696 | 14,400 |
| Locust bean meal | .0307 | 32,600 |
| Yucca starch | .0235 | 42,600 |
| Potato Amylopectin | .0216 | 46,300 |
| Guar gum (General Mills) | .0314 | 31,800 |
| Waxy Maize starch (Amioca) | .0175 | 57,100 |
| Soluble starch (Merck (Lintner)) | .0648 | 15,400 |
| Potato starch | .0446 | 22,400 |
| Wheat starch | .0228 | 43,900 |
| Sodium alginate (Algin) | .0332 | 30,100 |
| Dextrin | .0840 | 11,900 |
| Citrus pectin | .0143 | 69,900 |

It will be apparent that the embodiments shown are only exemplary and that various modifications can be made within the scope of my invention as defined in the appended claims.

By the expression dextran material I mean to include such materials as the Commercial Solvents blood plasma substitute or the materials sold under the name of "Macrodex."

I claim:
1. A new product, dextran $C^{14}$-carboxylic acid.
2. A process for the preparation of $C^{14}$-labeled polysaccharides which consists in reacting a polysaccharide with $C^{14}$-labeled cyanide, saponifying the resulting nitrile and isolating the radioactive polysaccharide derivative.

3. A process for the production of $C^{14}$-labeled dextran, consisting of reacting dextran material with $C^{14}$-labeled sodium cyanide in the presence of sodium carbonate, saponifying the resulting nitrile and isolating the radioactive dextran derivative.

4. A process for the production of $C^{14}$-labeled dextran, consisting of reacting dextran material with $C^{14}$-labeled sodium cyanide, saponifying the resulting nitrile, isolating, purifying and fractionating the radioactive dextran by adsorption on an ion exchange resin and elution with a base.

HORACE S. ISBELL.

References Cited in the file of this patent

UNITED STATES PATENTS

| Number | Name | Date |
|---|---|---|
| 1,057,437 | Liebrecht | Apr. 1, 1913 |

OTHER REFERENCES

Symposium on the Use of Isotopes in Biology and Medicine 1949, pages 161-64, 172-75, published, University of Wisconsin Press, Madison, Wisconsin.

Pigman-Carbohydrate Chemistry—1948, page 116.

Putnam et al., J. Biol. Chem. v. 173, pages 785-794 (1948).

Charkoff et al., J. Biol. Chem. v. 174, pages 1045-46 (1948).

Snowden, Science v. 109, page 229 (1949).

Gibbs, J. Biol. Chem. v. 179, pages 499-500 (1949).

Gronwall et al., Nature, January 13, 1945, page 45.